United States Patent [19]
Horling et al.

[11] Patent Number: 5,944,428
[45] Date of Patent: Aug. 31, 1999

[54] ROLLER BEARING ASSEMBLY

[75] Inventors: Peter Horling, Mainberg; Jurgen Sturzenberger, Ettleben, both of Germany

[73] Assignee: SKF GmbH, Germany

[21] Appl. No.: 08/929,968

[22] Filed: Sep. 15, 1997

[30] Foreign Application Priority Data

Sep. 16, 1996 [DE] Germany ............ 296 16 079 U

[51] Int. Cl.⁶ .................................................. F16C 33/72
[52] U.S. Cl. ........................................ 384/488; 384/564
[58] Field of Search .................................. 384/477, 539, 384/559, 561, 564, 569, 570, 903

[56] References Cited

U.S. PATENT DOCUMENTS

| | | | |
|---|---|---|---|
| 1,617,660 | 2/1927 | Young ........................ | 384/564 |
| 1,803,966 | 5/1931 | Gibbons ..................... | 384/564 |
| 1,970,449 | 8/1934 | Gibbons et al. ............. | 384/570 |
| 2,136,125 | 11/1938 | Delaval-Crow ............ | 384/539 |
| 3,404,926 | 10/1968 | Horne ........................ | 384/564 |
| 4,236,767 | 12/1980 | Feldle ........................ | 384/488 |

FOREIGN PATENT DOCUMENTS

| | | |
|---|---|---|
| 495 938 | 8/1960 | Germany . |
| 269 275 | 10/1950 | Switzerland . |

Primary Examiner—Thomas R. Hannon
Attorney, Agent, or Firm—Eugene E. Renz, Jr.

[57] ABSTRACT

In a roller bearing comprising inner and outer bearing rings spaced apart to define an annular space for a plurality of roller elements, at least one flange or sealing ring covering the annular space having at least two circumferentially spaced openings, closed on all sides, extending in the peripheral direction and forming radially deformable sections 9 and having at least one projection engagable in a ring-spaced groove in one of the bearing rings.

8 Claims, 2 Drawing Sheets

ROLLER BEARING ASSEMBLY

FIELD OF THE INVENTION

The present invention relates to roller bearings generally and more particularly to improvement in the flange rings or sealing rings holding rolling elements in place in the annular space between the inner and outer rings.

BACKGROUND OF THE INVENTION

Flange rings or sealing rings for roller bearings are not new per se. For example, in U.S. Pat. No. 1,970,449 for ANTIFRICTION BEARINGS, there is shown a roller bearing assembly having flange rings or sealing rings slotted in the manner of lock washers at points around the periphery. These rings are compressed radially for insertion into the ring-shape groove and are allowed to expand in the groove. These slotted flange rings have certain disadvantages and drawbacks. For example, the slot prevents the ends of the rolling elements from starting. It has been found that they become jammed, particularly when the bearing is used for transmitting axial forces.

Swiss Patent No. 269,274 shows a roller bearing wherein the bore or lateral surface of a closed flange ring is provided with radial projections or the like, which prevent axial displacement of the rolling elements after installation, that is, after the flange rings have been inserted into ring-shaped grooves of the bearing rings. For insertion, the flange rings are deformed slightly in the axial direction and then allowed to snap into the groove.

German Utility Model 1,819,230 shows a dust cover or the like for roller bearings. The cover is in the form of a cup spring which can be inserted into the ring-shaped groove in one of the bearing rings and then pressed flat. By this process, the outer edge expands to lock the dust cover firmly in place. It has been found that the Swiss and German arrangements are applicable in the case of closed flange rings only and specifically flange rings of rather limited width or wall thickness. A short coming therefore and a danger is that these flange rings will not remain tightly seated in the axial direction and under certain operating conditions, they will tend to creep in the peripheral direction during operation.

SUMMARY OF THE INVENTION

With the foregoing in mind, it is an objective of the present invention to provide a roller bearing of the type described above in which it is easy and simple to install the flange or sealing rings and also to remove them if necessary, even in the case of bearings of large dimensions. The present invention is characterized by novel features of construction and arrangement whereby the rings will remain seated satisfactorily under pretension in the ring-shaped groove in both the radial and axial directions.

In accordance with the present invention, there is provided a closed flange or sealing ring insertable in a ring-shaped groove or the like in one of the bearing rings characterized by a plurality of openings which are circumferentially spaced and distributed about the periphery of the flange or sealing ring and are of a configuration to form radially deformable sections for assembly and disassembly of the flange or sealing ring in the ring-shaped grooves. The openings which are closed on all sides and extend in the peripheral direction, essentially separate certain sections of the flange or sealing ring from the rest of the ring, so that these sections, during or after insertion of the flange or sealing ring into the ring-shaped grooves of the bearing ring, give way elastically or can be deformed in the radial and/or axial direction. Further, the configuration of the elastically deformable sections is such that they can be deformed by using a suitable tool to press the separate sections in the radial direction against the base of the ring-shaped groove. The other sections of the flange or sealing ring are connected to one another to form a continuous ring and are thus able to provide satisfactory guidance for the rolling elements in the axial direction.

In accordance with a specific feature of the invention, the recesses or openings are preferably designed as elongated peripherally extending slots and the separate lateral sections between the slots are provided with radially inwardly or outwardly pointing projections which engage in the ring-shaped groove after insertion and prevent the ring from shifting axially or falling out.

To rigidify the flange or sealing ring, in accordance with another specific feature of the present invention, the lateral sections defined by the recesses or opening include a projection pointing into the slot. If desired, this projection can be provided with a hole to receive a tool for activating the lateral section to remove the flange or sealing ring from the groove.

In accordance with another specific feature of the present invention, means are provided for pretensioning the flange or sealing ring in the radial direction. Specifically, in accordance with this feature of the invention, the base of the ring-shaped groove in the bearing may be provided with corrugations or alternating offsets in the radial and/or axial direction.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENTS

Figure 1:
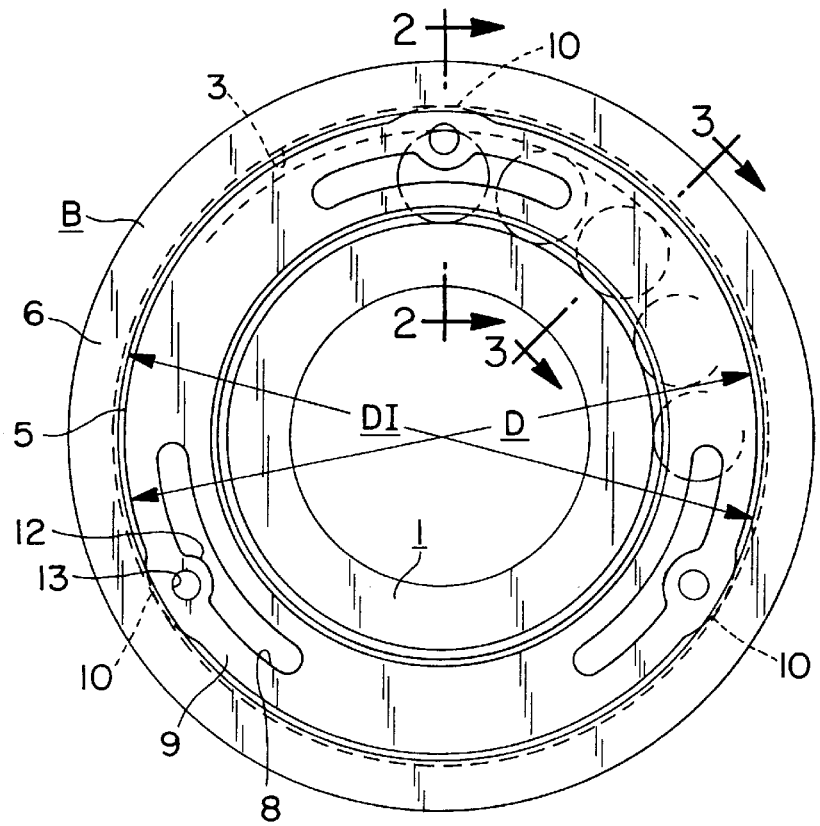
FIG. 1 is a front elevational view of a cylindrical roller bearing having flange rings and in accordance with the present invention flange rings are supported in the outer ring.
Figure 2:
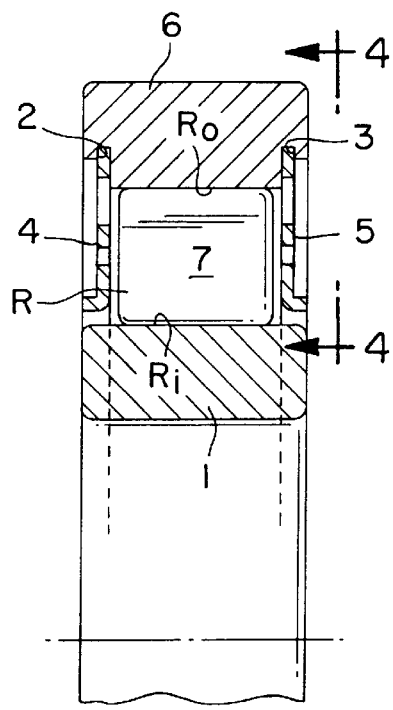
FIG. 2 is a enlarged fragmentary sectional view taken on the line 2,2 of FIG. 1 showing the flange rings retained in the outer ring of the cylindrical bearing assembly at one of a series of equally spaced locations about the circumferential of the outer bearing ring.
Figure 3:
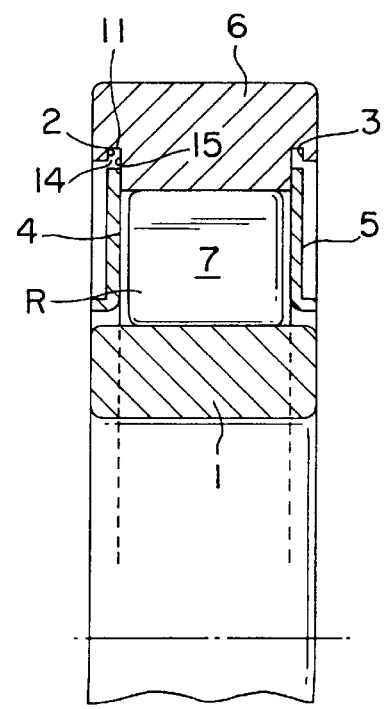
FIG. 3 is an enlarged fragmentary sectional view taken on the line 3,3 of FIG. 1 similar to FIG. 2 but showing the flange rings at a location intermediate the points of retention of the flange rings to the outer bearing ring.

Referring now to the drawings and particularly FIG. 1 thereof, there is shown a roller bearing assembly in accordance with the present invention, generally designated B. The bearing assembly B in the present instance is a cylindrical roller bearing comprising the usual inner and outer bearing rings 1 and 6 respectively having confronting circumferentially extending spaced raceways Ri and Ro and a plurality of cylindrical rollers 7 in the annular space between the raceways Ri and Ro. The roller bearing assembly also includes, in the present instance, flange rings 4, 5 detachably mounted in annular grooves 2 and 3 in the outer ring 6 so that they confront opposing axial ends of the rollers R in the manner shown in FIGS. 2 and 3.

Figure 4:
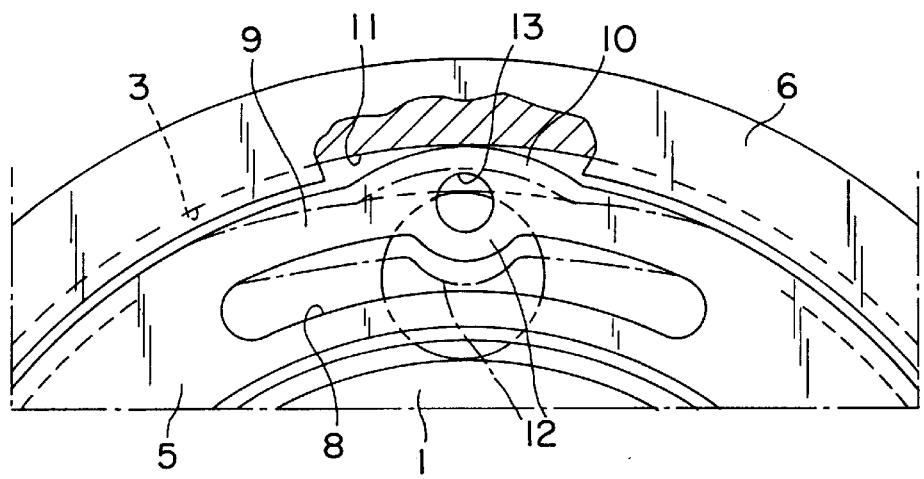
FIG. 4 is an enlarged fragmentary elevational view taken on the line 4,4 of FIG. 2, showing a position the outer rings is broken away and in section to clearly show details of both the retention of the flange ring to the outer bearing ring and in dot and dash line the inwardly directed deforming a flange ring retaining projection by means of a tool to accomplish either insertion or removal of the flange ring to the outer bearing ring.

In accordance with the embodiment illustrated in FIGS. 1–4, each flange ring 4, 5 has a series of circumferentially spaced, peripherally extending, elongated slots 8 which form radially deformable lateral sections 9. Each lateral section 9 has a radially outwardly directed projection 10, which as illustrated in FIGS. 1 and 4 projects beyond the outer diameter D of the flange ring body and is slightly larger than the diameter D1 defining the entrance opening to the grooves 2 and 3. The projections 10 in the installed state seat against the base 11 of the ring-shaped grooves 2 and 3. In the embodiment illustrated, each lateral section 9 has a radially inwardly directed projection 12, which projects into slot 8. A hole 13 is provided in the lateral section 9 radially aligned with the projections 10 and 12 to receive a deforming tool for displacing the lateral section 9 for example radially inwardly when it is desired to remove or install the flange ring.

Figure 6:
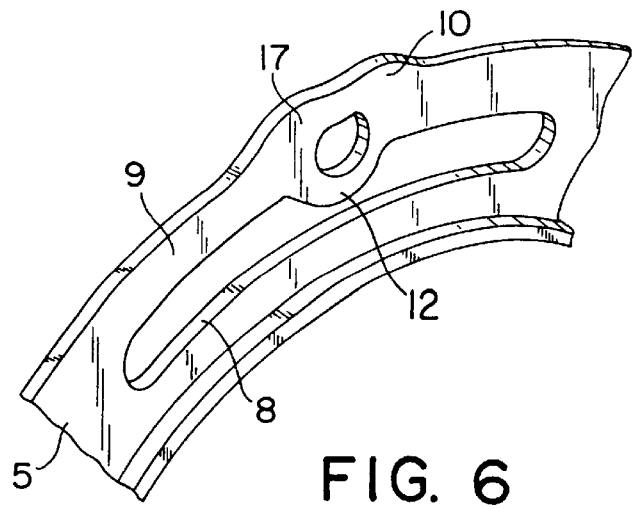
FIG. 6 is a fragmentary isometric view showing a portion of a flange ring having a modified retaining projection in that the projection may be slightly corrugated in the axial direction.

In accordance with another feature of the present invention facilitating pretensioning of the flange rings 4 and 5 between the confronting circumferentially extending lateral surfaces 14 and 15 defining ring shape grooves 2 and 3 projection 10 of the lateral sections 9 may be corrugated or provided with alternating offsets in the axial direction as at 17 depicted in FIG. 6.

Figure 5:
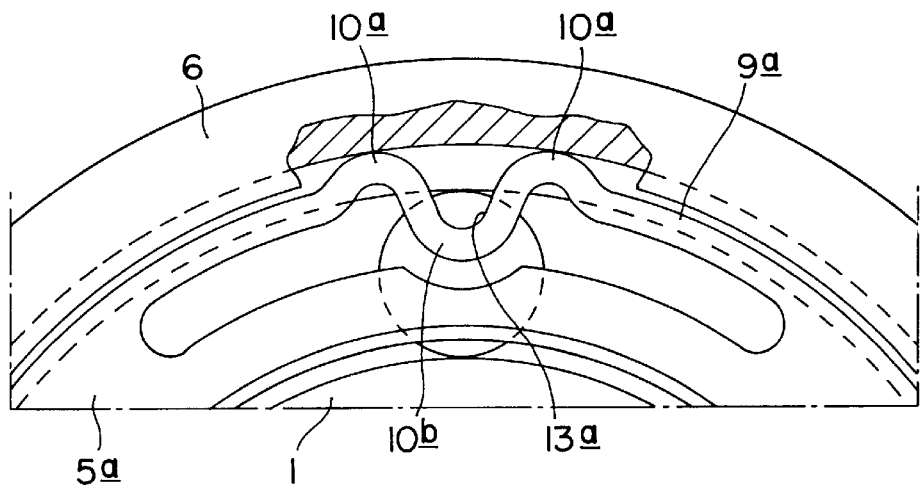
FIG. 5 is a view similar to FIG. 4 but showing a modified flange ring.

There is illustrated in FIG. 5 modified embodiment of flange ring 5a in accordance with the present invention. In accordance with this embodiment of the invention, a pair of radially outwardly directed projections 10a and a radially inwardly directed undulating projection 10b, define an opening 13a. In the present instance, the projections 10a extend radially beyond the diameter D of the flange ring body and in the assembled state they are seated in the grooves 2 and 3 in the manner described above in connection with the embodiment shown in FIGS. 1–4.

The opening 13a facilitates use of a tool which can be inserted therein to displace the flexible outer wall of the lateral section 9a and draw the projections 10a inwardly to a point where they clear the outer wall defining the opening in the outer ring. The flange ring of the present invention may be manufactured by many techniques and depending on the thickness of the walls of flange rings 4 and 5, the openings, that is slots 8 and projections 10 and 12 can be produced by stamping or by electrochemical and/or cutting methods.

Even though particular embodiments of the present invention have been illustrated and described herein, it is not intended to limit the invention and changes and modifications may be made therein within the scope of the following claims.

What is claimed:

1. In a roller bearing comprising inner and outer bearing rings spaced apart to define an annular space for a plurality of roller elements, at least one flange or sealing ring covering the annular space having at least two circumferentially spaced openings, closed on all sides, extending in the peripheral direction and forming radially deformable sections and having at least one projection engagable in a ring-spaced groove having a base in one of the bearing rings.

2. In a roller bearing assembly according to claim 1, characterized in that the openings are designed as slots extending in the peripheral direction.

3. In a roller bearing assembly according to claim 2, characterized in that the lateral sections separated off by the slots are provided with radially outward- and inward-pointing projections.

4. In a roller bearing assembly according to claim 2, characterized in that the section of the slot facing the base of the ring-shaped groove is corrugated in the radial direction.

5. In a roller bearing assembly according to claim 2, characterized in that the section of the slot facing the base of the ring-shaped groove is designed the alternating offsets in the axial direction.

6. In a roller bearing assembly according to claim 2, characterized in that the slots are provided at the half-way point of their length with a projection pointing into the slot.

7. In a roller bearing assembly according to claim 1, characterized in that the projection is provided with a hole.

8. In a roller bearing assembly according to claim 1, characterized in that the projection of the section has slightly alternating offsets in the axial direction.

* * * * *